United States Patent [19]
Spaniol et al.

[11] Patent Number: 5,229,920
[45] Date of Patent: Jul. 20, 1993

[54] PORTABLE DATA PROCESSING DEVICE WITH TURNABLE AND TELESCOPABLE DISPLAY

[75] Inventors: Peter Spaniol, Zirndorf; Rolf Schmücker, Stockdorf, both of Fed. Rep. of Germany

[73] Assignee: TA Triumph-Adler AG, Nürnberg, Fed. Rep. of Germany

[21] Appl. No.: 858,696

[22] Filed: Mar. 27, 1992

[30] Foreign Application Priority Data

Apr. 23, 1991 [DE] Fed. Rep. of Germany ....... 4113178

[51] Int. Cl.⁵ .................. H05K 7/16; G06F 1/16
[52] U.S. Cl. .................... 361/393; 361/380; 292/267
[58] Field of Search ............... 292/267, 268; 16/362, 16/364; 248/414; 74/527; 403/104, 95, 107, 96, 108, 99; 361/380, 392, 393, 394, 395, 399; 400/680, 682, 83; 364/708

[56] References Cited

U.S. PATENT DOCUMENTS

| | | | |
|---|---|---|---|
| 2,996,210 | 8/1961 | Thomas | 292/278 X |
| 3,153,123 | 10/1964 | Harman | 248/414 X |
| 3,871,607 | 3/1975 | Pile | 248/414 X |
| 4,278,223 | 7/1981 | Fauteux | 248/414 X |
| 4,620,808 | 11/1986 | Kurtin et al. | 400/83 |
| 4,650,145 | 3/1987 | Natzel et al. | 248/414 |
| 4,739,316 | 4/1988 | Yamaguchi et al. | 400/680 X |
| 4,749,364 | 6/1988 | Arney et al. | 361/380 |
| 4,808,017 | 2/1989 | Sherman et al. | 400/83 |
| 4,859,092 | 8/1989 | Makita | 400/83 |
| 4,932,695 | 6/1990 | Pettit et al. | 292/267 |
| 5,102,084 | 4/1992 | Park | 361/393 X |
| 5,107,402 | 4/1992 | Malgouires | 361/393 |

*Primary Examiner*—Leo P. Picard
*Assistant Examiner*—Michael W. Phillips
*Attorney, Agent, or Firm*—Michael J. Striker

[57] ABSTRACT

A portable data processing device in form of a laptop has a housing provided with a keyboard, a display arranged above the keyboard, a turnable holding element supporting the display turnably about the keyboard. The display is displaceable longitudinally on the holding element so as to be vertically adjustable independently of the turning of the display and so that in an upper end position a free space remains between a lower edge of the display and an upper edge of the housing.

11 Claims, 2 Drawing Sheets

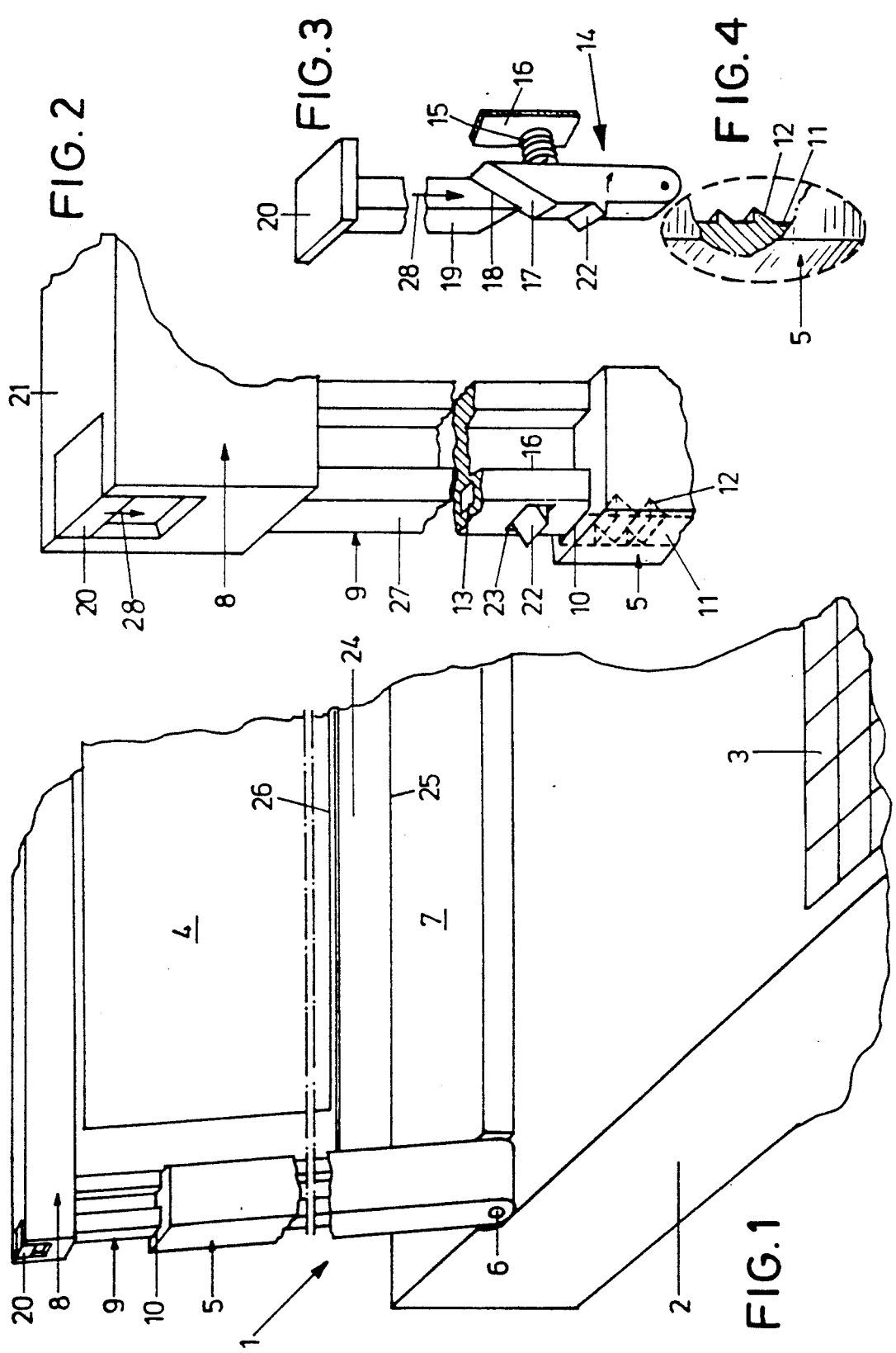

PORTABLE DATA PROCESSING DEVICE WITH TURNABLE AND TELESCOPABLE DISPLAY

BACKGROUND OF THE INVENTION

The present invention relates to a portable data processing device in form of a so-called laptop.

More particularly, it relates to a portable data processing device which has a housing with a keyboard and a display arranged above the keyboard on the upper side of the housing on a turnable holding arm.

Such laptops are sometimes used also stationarily in connection with a printer. In such operation the printing region of the printer is arranged behind the unfolded display, and the user sitting in front of the keyboard cannot follow the progress of the printing process directly or without body twisting.

SUMMARY OF THE INVENTION

Accordingly, it is an object of the present invention to provide a data processing device of the above mentioned general type which avoids the disadvantages of the prior art.

More particularly, it is an object of the present invention to provide a portable data processing device, in which during its operation in connection with the printer, both the display and also the printing region or generally a region located behind the data processing device can be seen.

In keeping with these objects and with others which will become apparent hereinafter, one feature of the present invention resides, briefly stated, in a portable data processing device, in which the display is arranged vertically adjustably along the holding arm, so that in the upper end position a free space remains between the lower edge of the display and the upper edge of the housing.

When the portable data processing device is designed in accordance with the present invention, it is possible to form the display in a conventional manner without structural changes so that it is turnable-in or foldable, and at the same time a vertical adjustment of the display can be performed. This leads to the user's comfort due to an adjustability to the eye level of the user, which can be utilized especially to provide a free observation of the region behind the display so that for example the printing region of a printer can be seen.

In accordance with another advantageous feature of the present invention the display is arranged on an upper transverse rail from which at each side telescopable portions extend downwardly and engage removably into the holding arm. Correspondingly a coordinated pulling out movement of both telescopable arms is provided. It is to be understood that a reversal of this arrangement is possible within the spirit of the present invention, so that the telescopable arms embrace the holding arms. For the sake of simplicity the first mentioned option will be explained hereinbelow, while in accordance with the present invention the telescopable principle as such can be used.

The telescopable projections can be formed preferably as U-shaped profiles or L-shaped profiles. As a result an especially stable, play-free guidance is obtained.

This embodiment provides for the adjustment of a definite frictional engagement. Therefore an adjusted pulling-out position remains stable and unchanged without additional fixing means.

Alternatively, the holding arms in their longitudinal direction can be provided with a plurality of locking protrusions or grooves, and a spring-biased locking element on the telescopable projection can engage in the locking protrusions or recesses in a form-locking manner.

It is also to be understood here that a reverse of this construction is possible so as to arrange the locking elements on the holding arms.

With the above described arrangement it is possible to adjust definite pulling-out positions in an absolutely end-stable manner, due to the arresting protrusions and arresting recesses.

For unlocking and performing an adjustment, the locking element may be unlocked by a key on the upper side of the transverse strip for the height adjustment. In accordance with one embodiment the locking elements mounted on the holding arms can be also provided there with unlocking keys.

In accordance with another preferable embodiment of the invention, a transmission rod with an inclined surface is arranged underneath the actuating key. The inclined surface acts on a corresponding inclined surface of the locking element so that during the actuation the longitudinally guided actuating rod presses the locking element in direction perpendicular to the actuation rod outwardly in a releasing direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective partial view of a laptop with an unfolded display;

FIG. 2 is a perspective partial view of an engaging region of a telescopable projection in a holding arm;

FIG. 3 is a perspective explosive view of an arresting mechanism; and

FIG. 4 is an enlarged partially broken away view of the area circled in FIG. 2.

DESCRIPTION OF THE PREFERRED EMBODIMENT

Figure 2A:
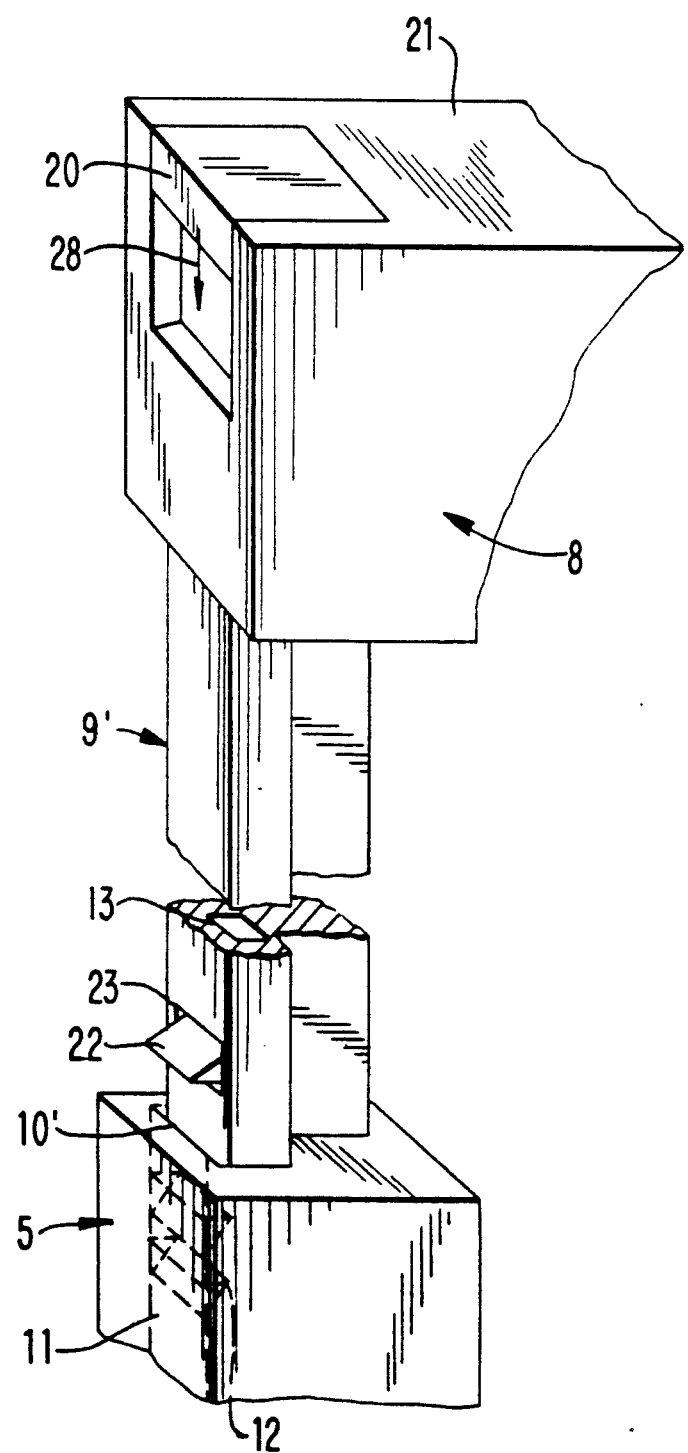
FIG. 2a is a view corresponding to the view of FIG. 2 but showing another embodiment of the telescopable projection.

A data processing device is identified as a whole with reference numeral 1 and formed as a laptop. It has a housing 2 with a keyboard 3 arranged on the upper side of the housing.

A display 4 is supported above the keyboard 3 on the upper side of the housing. The display 4 is supported by holding arms 5 turnably about an axis 6, so that in the downwardly folded condition the display is flush with the upper side 7 of the housing. In the unfolded position shown in the drawings, the display 4 can be observed by a user.

The display 4 is mounted on a transverse rail 8 which extends between both holding arms 5. For the sake of simplicity only one holding arm 5 is shown in the drawings. Telescopable projections 9 extend on the outer side of the transverse rail 8. They engage in guiding recesses 10 of the holding arms 5 and are telescopably displaceable. In the FIG. 2 the telescopable projections 9 have a U-shaped profile, and the guiding recesses 10 are shaped correspondingly to this profile. In FIG. the telescopable projections 9' have an L-shaped profile, and the guiding recesses 10' are shaped correspondingly.

As shown on an enlarged scale in FIG. 2, a plurality of arresting or locking protrusions 12 are formed on the outer side 11 of the guiding recess 10. The telescopable projections 9 are provided with a longitudinal recess 13 on their outer leg 27, and a locking element 14 shown on an enlarged scale in FIG. 3 is arranged in the longitudinal recess 13. The locking element 14 is biased by a pressure spring 15 supported on an inner side 16 of the outer leg 12.

An inclined surface 17 is formed on the upper side of the locking element 14, and a corresponding inclined surface 18 of a lower end 19 of an actuating rod abuts against the inclined surface 17. The actuating rod 19 extends through the guiding recess 13 in the longitudinal direction and its upper side is provided with an actuating key 20 which in nonactuated condition is flush with an upper side 21 of the transverse rail 8.

When the actuating key 20 is pressed in direction of the arrow 28, the inclined surface 18 presses against the inclined surface 17, and the locking element 14 is pressed to the right in the drawings. Thereby an arresting protrusion 22, which extends through a recess 23 in the outer side wall of a leg 27 and in non-actuated condition provides a locking with the arresting protrusion 22, is pressed to the right in FIG. 3 and therefore pressed out of its engagement. As a result, with an actuation of a key 20 a vertical adjustment can be performed.

When for example the display must be moved upwardly, a free space 24 is produced between an upper edge 25 of the housing 2, and a lower edge 26 of the display 4. Therefore, it makes possible observation of the printing region of a printer located behind it.

It will be understood that each of the elements described above, or two or more together, may also find a useful application in other types of constructions differing from the types described above.

While the invention has been illustrated and described as embodied in a portable data processing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A portable data processing device in form of a laptop, comprising a housing provided with a keyboard; a display arranged about said keyboard; two holding arms spaced from one another in a transverses direction and turnable relative to said housing about a transverse axis, said holding arms having lower ends turnably connected with said housing and also having upper ends; a transverse member located above said upper ends of said holding arms and having downwardly extending telescopable projections engaging in said holding arms and movable out of said holding arms, said transverse member supporting said display so that said display extends downwardly form said transverse member between said holding arms, said display being turnable downwardly together with said transverse member and said holding arms so as to be flush with an upper side of said housing and also being turnable upwardly together with said transverse member and said holding arms to be observed by the user and in an upward position of said display being displaceable longitudinally by telescoping of said projections in said holding arms independently of the turning of said display, so as to be vertically adjustable and so that in an upper end position a free space remains between a lower edge of said display and upper edge of said housing.

2. A portable data processing device as defined in claim 1, wherein said transverse member is formed as a transverse rail.

3. A portable data processing device as defined in claim 1, wherein said telescopable projections have a U-shaped profile.

4. A portable data processing device as defined in claim 1, wherein said telescopable projections have an L-shaped profile.

5. A portable data processing device as defined in claim 1, wherein said telescopable projections engage in said holding element with a frictional engagement.

6. A portable data processing device as defined in claim 1, wherein said holding element has a plurality of locking formations, said telescopable projections having a spring-biased locking element which engages in said locking formations.

7. A portable data processing device as defined in claim 6, wherein said locking formations are formed as locking protrusions.

8. A portable data processing device as defined in claim 6, wherein said locking formations are formed as locking recesses.

9. A portable data processing device as defined in claim 9; and further comprising a key which unlocks said locking element for a vertical adjustment of said display.

10. A portable data processing device as defined in claim 9, wherein said transverse member has an upper side, said key being provided on said upper side of said transverse member.

11. A portable data processing device in form of a laptop, comprising a housing provided with a keyboard; a display arranged above said keyboard; a turnable holding element supporting said display turnably about said keyboard, said display being displaceable longitudinally on said holding element so as to be vertically adjustable and so that in an upper end position a free space remains between a lower edge of said display and an upper edge of said housing. transverse member provided with downwardly extending telescopable projections which engage in said holding element and are movable out of said holding element, said display being arranged on said transverse member, said holding element having a plurality of holding formations, said telescopable projections having a spring biased locking element which engages in said locking formations; a key which unlocks said locking element for a vertical adjustment of said display; and an actuating rod arranged under said key and provided with an inclined surface, said locking element being provided with an inclined surface such that said inclined surface of said actuating rod acts on said inclined surface of said locking element and during actuation of said actuating rod said locking element is pressed perpendicular to said actuating rod to a released position.

* * * * *